United States Patent Office 3,044,270
Patented July 17, 1962

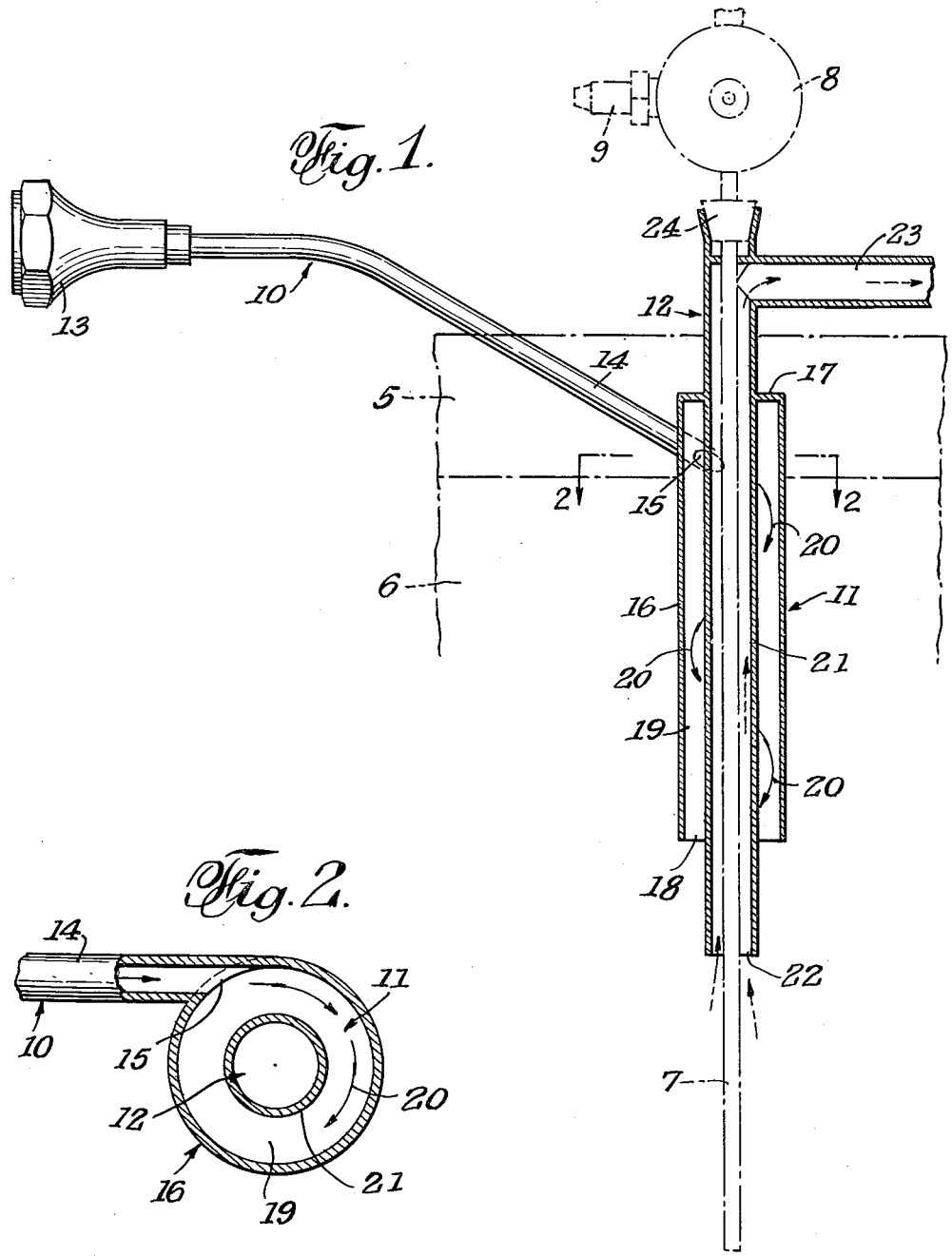

3,044,270
ANTI-SPLASH LIQUID GAS FILLER
Robert E. Biever, 3646 N. Vacino Drive, Covina, Calif.
Filed Jan. 18, 1960, Ser. No. 2,881
7 Claims. (Cl. 62—55)

This invention relates to a filler device for handling liquid gas, such as nitrogen, oxygen and argon and has for an object to provide means that minimizes splash and other such violent and dangerous vapor-generating action during transfer of such highly volatile liquids from one container to another.

In the filling of cold traps for vacuum pumps, for instance, with liquid nitrogen, orderly, non-splashing delivery of said liquid gas from the container in which transported to such traps, will provide proper exhaust or venting of released gases as well as keeping cool the filler chamber and thereby lessening evaporation of the liquid nitrogen during a filling operation. Heretofore, such transfer of liquid gases was carried out in a manner to deposit the liquid in the usual gravity flow into the receiving receptacle, incurring splash and generating heat that increased evaporation. The present invention contemplates filler means that obviates the above-mentioned faults and, by providing a cool, non-splashing and safely vented transfer of liquid gas, produces a pressure relieved and thoroughly safe transfer means, as contemplated.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a vertical sectional view of a liquid gas filler embodying the present invention, the same being shown in connection with a cold trap for vacuum pumps and with means to automatically stop delivery of gas in said trap.

FIG. 2 is an enlarged cross-sectional view, as taken on line 2—2 of FIG. 1.

FIG. 1 shows a cold trap 5 for vacuum pumps, the interior 6 of which is to receive a liquid gas, specifically, liquid nitrogen, by transfer from a suitable tank or gas container in which such gas is transported. It is common practice to provide an automatic flow control from such a supply container to the interior 6 to automatically shut off flow when the liquid in the trap reaches a desired predetermined level. Such well-known means may comprise a probe 7 that extends into the interior 6 and which is subject to temperatures generated in said interior, a bellows-controlled valve 8 on the end of said probe that has a connection 9 to the source or tank of liquid gas and controls the flow valve (usually, a solenoid valve) of the tank. In any case, automatic shut-off of inlet flow may be combined with the present anti-splash and vented filler without affecting the safe operation of said filler. It will be understood, of course, that the present filler will carry out its assigned function without provision for automatic shut-off of supply.

The present gas filler comprises, generally, an inlet tube 10, an expansion chamber 11 that receives the discharge of said tube and empties in a downward direction into the interior 6 of the cold trap 5, and a vent or gas exhaust 12 concentrically disposed within the chamber 11 to vent the interior of the cold trap. The inlet 10 is shown as a small length of tubing that has an end fitting 13 adapting the same for connecting to the outlet of a tank or other source of liquid gas. The outlet end of said tubing is preferably downwardly sloped as at 14, the angle of slope imparting to the liquid flowing an angularly downward direction as the liquid exits from the outlet 15.

The expansion chamber 11 is shown as an elongated tubular housing having a cylindrical wall 16 and a top closure wall 17, said housing being open at its lower end 18. The outlet 15 of the tube 10 enters the chamber interior 19 of the housing at a tangent and, at the angle of the downwardly sloped portion 14 of the inlet tube 10. As a consequence, flow from said tube follows a helical path exemplified by the arrows 20, the swirling flow moving along the inner face of wall 20 in a smooth, non-turbulent manner. Since the area of chamber 11 is larger than that of the inlet tube 14, the flow is a free, expanding flow in which the liquid has continuous contact with the wall 16 to cool the same and thereby minimize evaporation of the liquid gas being handled.

The flow exits in a swirl from the end 18 of the expansion chamber and is in attenuated conical form that diverges smoothly into the interior 6 of the cold trap 5. It will be clear that such a discharge will not only minimize splash of the delivered liquid gas and, therefore, greatly lessen evaporation thereof, but, even such little splash that does occur will take place away from the axis of the chamber 11, i.e., radially outward of the area immediately below the outlet 18.

The vent 12 comprises a tube 21 having its lower end 22 below the discharge end 18 of the expansion chamber 11 and extending above the end wall 17 of the latter. Said tube 21, being preferably concentric with the expansion chamber and substantially smaller, gives an annulus form to said chamber, as seen in FIG. 2.

It will be evident that vapors released in the interior 6 of the cold trap may vent or exhaust upwardly through the vent 12 and that the exhaust flow to the end 22 is within the conical area enclosed by the swirling conical discharge from the expansion chamber. In other words, the interior 6 of the cold trap does not vent through the inlet of liquid gas but rather through the center space encompassed by the inlet flow. Therefore, the exhaust takes place in a quiet environment and is of minimum degree therefor.

As is common practice in exhausts as volatile as the vapors of liquid nitrogen or similar gases, the outlet 23 of the vent 12 is directed laterally and then preferably downwardly or in a lateral or downward direction that would minimize the possibility of accident, such as may occur with an upwardly directed vent.

The probe 7 extends axially through the vent and where the same extends thereabove to the valve 8, a seal 24 is provided between the probe and the vent, as shown.

It will be noted that the probe 7 is in the quiescent area beneath the filler means and, therefore, is not subject to such splashing as may occur in interior 6. Only the relatively small lower end of said probe may be splashed as the level of liquid in the trap approaches the same.

In the above manner, the present filler means provides for a non-splashing, pressure-relieved filling operation with liquid gas for vessels or containers such as the cold trap 5, thereby minimizing dangers attending such an operation, lessening vaporization of the liquid gas, and rendering more accurate the operation of automatic flow shut-off means, if the latter is used.

While I have illustrated and described what I now contemplate to be the best mode of carrying out my invention, the construction is, of course, subject to modification without departing from the spirit and scope of my invention. Therefore, I do not wish to restrict myself to the particular form of construction illustrated and described, but desire to avail myself of all modifications that may fall within the scope of the appended claims.

Having thus described my invention, what I claim and desire to secure by Letters Patent is:

1. A filler device for liquid gas comprising an elongated expansion chamber closed at the top and open at the bottom, a liquid gas inlet connected adjacent the closed end of said chamber and opening thereinto and directed to discharge a helical flow of liquid gas into the chamber to cause said gas to swirl downwardly and outwardly from said open end, and a vapor vent independent of the mentioned inlet and extending longitudially upwardly through said chamber from a point substantially below the lower end of the chamber through said closed end of the chamber to exhaust vapors released from the liquid gas that discharges from the open end of the expansion chamber.

2. A filler device according to claim 1 in which the liquid gas inlet has a tangential connection with the chamber.

3. A filler device according to claim 1 in which the liquid gas inlet has a tangential connection with the chamber, and said inlet comprises a tube disposed at such an angle to the chamber that the discharge of said tube is directed angularly downwardly as well as rotationally, whereby the flow in the chamber is helical.

4. A filler device for liquid gas comprising a top-closed, bottom-open elongated expansion chamber, an inlet to the upper end of said chamber and directed to discharge liquid gas into said chamber in a downwardly directed helical swirl that follows around the wall of said chamber to cool the same, said helical discharge being directed to exit from the open bottom of the chamber and fall as a conical discharge wider than the size of the chamber, and a vent extending through the chamber from a point below the bottom of the expansion chamber and in the area encompassed by said conical discharge to a point above the closed end of chamber to exhaust vapors released from said discharge.

5. A filler device according to claim 4 in which the expansion chamber and vent are concentric.

6. A non-splash filler device comprising an elongated expansion chamber closed at the top and having a cylindrical chamber wall open at the bottom, a tangentially connected inlet tube joining said chamber wall near its upper end and discharging a downwardly spiraling swirl of liquid along the inner face of said wall, the swirling liquid discharging in a conical, outwardly spreading form from the open end of said chamber, and a vent tube open to the center of said conical discharge below the open bottom of the expansion chamber and exhausting vapors released thereby upwardly through the expansion chamber interiorly of the swirling flow therein, the upper end of the vent tube exending through and above the closed top of the expansion chamber.

7. In a non-splash filler device provided with an expansion chamber having an open bottom and into which liquid gas is directed in a manner to cause said gas to follow a downwardly spiraling path along the inner face of said chamber and, thereby to discharge in a conical, outwardly spreading form from the lower end of said chamber, a substantially centrally disposed vent tube within said expansion chamber for conducting gases generated by said discharge upward to a vent outlet above the expansion chamber, the improvement that comprises an extension of the lower end of the vent tube below the lower end of the chamber and open to the center of the conical discharge above mentioned.

References Cited in the file of this patent

UNITED STATES PATENTS

| | | |
|---|---|---|
| 847,729 | Clements et al. | Mar. 19, 1907 |
| 1,845,247 | Davidson | Feb. 16, 1932 |
| 2,287,795 | Hall | June 30, 1942 |
| 2,645,907 | De Froste et al. | July 21, 1953 |
| 2,671,645 | Buis | Mar. 9, 1954 |
| 2,784,561 | Postlewaite | Mar. 12, 1957 |